United States Patent
Schneider et al.

(10) Patent No.: US 11,584,464 B2
(45) Date of Patent: Feb. 21, 2023

(54) METHODS FOR PRODUCING A THREE-DIMENSIONAL VEHICLE DOOR FRAME INNER REINFORCEMENT ELEMENT, FOR PRODUCING A VEHICLE DOOR FRAME AND FOR PRODUCING A VEHICLE REINFORCEMENT STRUCTURE

(71) Applicant: ArcelorMittal, Luxembourg (LU)

(72) Inventors: Nicolas Schneider, Saint-Martin-Longueau (FR); Yves Drouadaine, Pontoise (FR)

(73) Assignee: ARCELORMITTAL, Luxembourg (LU)

( * ) Notice: Subject to any disclaimer, the term of this patent is extended or adjusted under 35 U.S.C. 154(b) by 21 days.

(21) Appl. No.: 17/165,881

(22) Filed: Feb. 2, 2021

(65) Prior Publication Data

US 2021/0155306 A1   May 27, 2021

Related U.S. Application Data

(63) Continuation of application No. 15/512,901, filed as application No. PCT/IB2014/064728 on Sep. 22, 2014, now Pat. No. 10,974,780.

(51) Int. Cl.
*B62D 65/06*   (2006.01)
*B62D 25/04*   (2006.01)
(Continued)

(52) U.S. Cl.
CPC .......... *B62D 65/06* (2013.01); *B21D 22/022* (2013.01); *B21D 47/01* (2013.01); *B23K 26/21* (2015.10);
(Continued)

(58) Field of Classification Search
CPC .... B62D 65/06; B62D 23/005; B21D 22/022; B21D 47/01; B23K 26/21; B23K 2101/006; B23K 2103/04
See application file for complete search history.

(56) References Cited

U.S. PATENT DOCUMENTS

| | | | |
|---|---|---|---|
| 4,203,203 A | 5/1980 | Gilissen et al. | |
| 5,938,275 A | 8/1999 | Kleinhans et al. | |
| (Continued) | | | |

FOREIGN PATENT DOCUMENTS

| | | |
|---|---|---|
| CN | 1829813 A | 9/2006 |
| CN | 101121420 A | 2/2008 |
| (Continued) | | |

OTHER PUBLICATIONS

Machine Translation for DE-102004044054-A1 (Year: 2006).*
(Continued)

*Primary Examiner* — David P Bryant
*Assistant Examiner* — Christine Bersabal
(74) *Attorney, Agent, or Firm* — Davidson, Davidson & Kappel, LLC

(57) ABSTRACT

A method is for producing a three-dimensional vehicle door frame inner reinforcement element (52) including an inner center pillar part (66), an inner front pillar part (68) and an inner side rail part (64) joining the inner center pillar part (66) and the inner front pillar part (68). The method includes providing an inner center pillar blank, an inner front pillar blank and an inner side rail blank, said inner blanks being substantially planar, assembling the inner center pillar blank and the inner front pillar blank to the inner side rail blank in order to form a substantially planar door frame inner reinforcement blank, and hot stamping the door frame inner reinforcement blank to shape the three-dimensional door frame inner reinforcement element (52).

18 Claims, 4 Drawing Sheets

(51) Int. Cl.
*B62D 25/02* (2006.01)
*B62D 25/20* (2006.01)
*B23K 26/21* (2014.01)
*B21D 22/02* (2006.01)
*B21D 47/01* (2006.01)
*B23K 101/00* (2006.01)
*B23K 103/04* (2006.01)

(52) U.S. Cl.
CPC ............ *B62D 25/02* (2013.01); *B62D 25/04* (2013.01); *B62D 25/2036* (2013.01); *B23K 2101/006* (2018.08); *B23K 2103/04* (2018.08)

(56) References Cited

U.S. PATENT DOCUMENTS

| | | | |
|---|---|---|---|
| 6,073,992 | A | 6/2000 | Yamauchi et al. |
| 6,296,805 | B1 | 10/2001 | Laurent et al. |
| 7,396,072 | B2 | 7/2008 | Fischer et al. |
| 7,559,998 | B2 | 7/2009 | Nishibata et al. |
| 7,815,247 | B2 * | 10/2010 | Obayashi ............... B62D 25/04 296/193.06 |
| 8,307,680 | B2 | 11/2012 | Drillet et al. |
| 8,646,833 | B2 | 2/2014 | Fujii et al. |
| 9,193,405 | B2 | 11/2015 | Pohl et al. |
| 2005/0046238 | A1 * | 3/2005 | Miyoshi ............. B62D 25/2036 296/203.03 |
| 2006/0097549 | A1 | 5/2006 | Fischer et al. |
| 2006/0185774 | A1 | 8/2006 | Nishibata et al. |
| 2007/0074556 | A1 * | 4/2007 | Heatherington ...... B21C 37/155 72/177 |
| 2008/0315628 | A1 | 12/2008 | Obayashi |
| 2010/0259070 | A1 | 10/2010 | Klein |
| 2011/0049937 | A1 | 3/2011 | Fuji et al. |
| 2011/0165436 | A1 | 7/2011 | Drillet et al. |
| 2011/0233970 | A1 | 9/2011 | Nagai et al. |
| 2012/0200119 | A1 | 8/2012 | Juettner et al. |
| 2013/0076075 | A1 * | 3/2013 | Pohl ..................... B62D 65/06 72/364 |
| 2013/0088037 | A1 | 4/2013 | Schurter et al. |
| 2014/0084633 | A1 | 3/2014 | Matsuda et al. |
| 2014/0246129 | A1 | 9/2014 | Amtmann et al. |
| 2015/0101193 | A1 | 4/2015 | Schurter et al. |

FOREIGN PATENT DOCUMENTS

| | | | |
|---|---|---|---|
| CN | 101327810 A | | 12/2008 |
| CN | 101583486 A | | 11/2009 |
| CN | 102001362 A | | 4/2011 |
| DE | 102004044054 A1 * | | 3/2006 ............. B62D 25/02 |
| DE | 102004044054 A1 | | 3/2006 |
| DE | 102004053917 B3 | | 4/2006 |
| DE | 102010019999 A1 | | 11/2011 |
| DE | 102011113675 A1 | | 3/2013 |
| DE | 102011119562 A1 | | 5/2013 |
| EP | 0001477 A1 | | 4/1979 |
| EP | 3197752 B1 | | 12/2018 |
| JP | 2000272538 A | | 10/2000 |
| JP | 2005075132 A | | 3/2005 |
| JP | 2007216903 A | | 8/2007 |
| JP | 2011195107 A | | 10/2011 |
| JP | 2011195108 A | | 10/2011 |
| JP | 2014521833 A | | 8/2014 |
| KR | 1019990085506 A | | 12/1999 |
| KR | 20120126905 A | | 11/2012 |
| WO | WO2006027167 A1 | | 3/2006 |
| WO | WO2013049801 A1 | | 4/2013 |

OTHER PUBLICATIONS

Munera et al.: Innovative Press Hardened Steel Based Lase Welded Blanks Solutions for Weight Savings and Crash Safety Improvements, SAE International; 2008.
List of PowerPoint Presentations given on May 14, 2014 during the seminar "Great Designs in Steel 2014" in Michigan.
Tandon et al., "Lightweight door ring concepts using hot stamped laser welded blanks," Great Designs in Steel 2014, Steel Market Development Institute,Michigan; May 14, 2014, presentation (2014).
T. Taylor et al., "Critical review of automotive hot-stamped sheet steel from an industrial perspective," Materials Science and Technology, vol. 34, No. 7, p. 809-861 (2018)(cited by the Japanese Patent Office to establish the publication date of the above Tandon et al. 2014 article).
Xie Wencai et al.,"Automotive Processes and Materials" Typical Automotive Stamping Defect Analysis Based on Grid Analysis, No. 6, 2013, pp. 1-5.
The Office Action issued in connection with corresponding Chinese Application No. 201480082907.5 dated Aug. 20, 2019.
The Affidavit filed in connection with the Opposition of corresponding EP3197752 on Sep. 18, 2019.
Xie Wencai et al.: "Forming Defect Analysis for Typical Automotive Stamping Parts Based on Grid Analysis Method" AT&M Field of Vision, No. 6, 2013, pp. 1-5. See translation enclosed.
Vierstraete et al., "Lasers make advances in auto-body door rings—Hot stamping enables enhanced body performance," Industrial Laser Solutions, pp. 1 to 6, May 27, 2014.
Altair enlighten award, 2013, ArcelorMittal, Industry First Hot Stamped Door Ring.
Aubron, "Steel providing solutions to OEMs challenges," ArcelorMittal, Sep. 18, 2013.
Hickey, "Hot Forming Overview," AHSS Insights, Sep. 12, 2018.
APT document, "Press Hardening History" (date has not been established).
Billur, "Hot Stamping of Ultra High-Strength Steels," pp. 11, 157 to 167, 185, 186 (2019).

* cited by examiner

METHODS FOR PRODUCING A THREE-DIMENSIONAL VEHICLE DOOR FRAME INNER REINFORCEMENT ELEMENT, FOR PRODUCING A VEHICLE DOOR FRAME AND FOR PRODUCING A VEHICLE REINFORCEMENT STRUCTURE

This is a Continuation of U.S. patent application Ser. No. 15/512,901, filed Mar. 21, 2017 which is a National Phase of International Patent Application PCT/IB2014/064728, filed Sep. 22, 2014, the entire disclosures of which are hereby incorporated by reference herein.

The present disclosure relates to a method for producing a three-dimensional vehicle door frame inner reinforcement element, said door frame inner reinforcement element comprising at least an inner center pillar part, an inner front pillar part and an inner side rail part joining the inner center pillar part and the inner front pillar part.

In particular, the present disclosure relates to the production of vehicle reinforcement elements such as a door frame inner reinforcement element. The present disclosure applies more specifically to vehicles of the body-on-frame type, for example pick-up trucks.

BACKGROUND

Conventionally, vehicles comprise reinforcement elements destined to protect the vehicle occupants in case of an impact, in particular a side impact, a front impact or a roof crush during a rollover accident, by limiting intrusions of any kind in the vehicle passenger compartment.

The reinforcement elements comprise, on each side of the vehicle, a body side structure forming a door frame, which is conventionally made of steel. The door frame is a three-dimensional part generally comprising several sections, including a side rail, a center pillar, a front pillar and a lowerside sill, which together define a door opening.

Reducing the overall weight of the vehicle is very desirable in order to reduce the energy consumption, so as to meet the future environmental requirements. It is thus desirable to reduce the thickness of the parts forming the vehicle, in particular the reinforcement elements, including the door frame.

However, simply reducing the thickness of the reinforcement elements generally leads to a degraded protection of the vehicle occupants against intrusions.

Steels having better mechanical properties such as yield strength or tensile strength may be used. Indeed, such steels provide an enhanced protection that lower grade steels for a given thickness. However, such steels generally have a lower formability.

Besides, it is known to produce a door frame by cutting a steel sheet to form a flat blank with the desired dimensions, and to stamp the flat blank so as to shape the door frame to the desired final three-dimensional shape. However, this method involves important off-cuts, and thus material losses. Moreover, this method implies a uniform thickness for the whole door frame, whereas specific thicknesses may be desirable for each section of the door frame as a function of the mechanical stresses the section may be subjected to. Hence, this method implies that some of the sections of the door frame are thicker than necessary, which results in a higher weight for the door frame.

To solve this problem, it has been proposed to produce a door frame by stamping several blanks separately, so as to form stamped parts, and by assembling the stamped parts so as to form the door frame. The assembling is generally performed by spot welding. Indeed, the parts, once stamped, are subjected to elastic recovery, so that the precise alignment of the edges of the parts required by laser welding can generally not be achieved. However, spot welding results in the formation of discontinuous results weld joints which may impair the resistance of the door frame.

SUMMARY

An object of the present disclosure is to solve the abovementioned problems, and in particular to provide a method for producing reinforcement elements having reduced thickness and weights together with a satisfactory protection to the vehicle occupants.

To that end, a method of the aforementioned type is provided, said method comprising the following steps:
  providing at least an inner center pillar blank, an inner front pillar blank and an inner side rail blank, said inner blanks being substantially planar,
  assembling the inner center pillar blank and the inner front pillar blank to the inner side rail blank in order to form a substantially planar door frame inner reinforcement blank,
  hot stamping the door frame inner reinforcement blank to shape the three-dimensional door frame inner reinforcement element.

Assembling the inner blanks to form the door frame inner reinforcement blank before hot stamping the door frame inner reinforcement blank allows the use of a single press for shaping the whole vehicle door frame inner reinforcement element, which reduces the cost of the production of the vehicle door frame inner reinforcement element.

Moreover, the formation of the door frame inner reinforcement blank by assembling several inner blanks allows having a varying thickness between the different parts of the vehicle door frame inner reinforcement element, and further allows the reduction of material use thanks to improved nesting.

According to other advantageous aspects of the present disclosure, the method for producing a three-dimensional vehicle door frame inner reinforcement element comprises one or more of the following features, considered alone or according to any technically possible combination:
  the door frame inner reinforcement element comprises a roof reinforcement part extending in a direction substantially perpendicular to the inner front pillar part and to the inner side rail part, said roof reinforcement part being obtained by hot stamping a roof reinforcement blank made integral with the inner side rail blank;
  the inner blanks are made of a press hardening steel;
  the press hardening steel is Usibor®;
  the press hardening steel has a tensile strength higher than or equal to 1300 MPa after the hot stamping step;
  the inner center pillar blank and the inner front pillar blank are assembled to the side rail blank by laser welding such that the inner center pillar blank and the inner front pillar blank are each joined to the inner side rail blank by a continuous weld line.

The present disclosure also relates to a method for producing a vehicle door frame comprising at least a front pillar, a center pillar and a side rail, formed by the assembly of a three-dimensional vehicle door frame outer reinforcement element and of a three-dimensional vehicle door frame inner reinforcement element, said method comprising the following steps:
  producing a three-dimensional vehicle door frame outer reinforcement element, producing a three-dimensional vehicle door frame inner reinforcement element by a method according to the present disclosure, assembling the door frame outer reinforcement element and the door frame inner reinforcement element to form the vehicle door frame.

According to other advantageous aspects of the present disclosure, the method for producing a vehicle door frame comprises one or more of the following features, considered alone or according to any technically possible combination:

the door frame outer reinforcement element comprises at least an outer center pillar part, an outer upper front pillar part and an outer side rail part joining the outer center pillar part and the outer upper front pillar part, the step of producing the three-dimensional vehicle door frame outer reinforcement element comprising the following steps:

providing at least an outer center pillar blank, an outer upper front pillar blank and an outer side rail blank, said outer blanks being substantially planar, assembling the outer center pillar blank and the outer upper front pillar blank to the side rail blank in order to form a substantially planar door frame outer reinforcement blank, hot stamping the door frame outer reinforcement blank to shape the three-dimensional vehicle door frame outer reinforcement element;

the outer blanks are made of a press hardening steel;

the door frame outer reinforcement element further comprises an outer lower front pillar part joined to the outer upper front pillar part and an outer lowerside sill part joining the outer lower front pillar part to the outer center pillar part, the step of producing the three-dimensional vehicle door frame outer reinforcement element further comprising the following steps:

providing an outer lower front pillar blank and an outer lowerside sill blank, said blanks being substantially planar, assembling the outer lower front pillar blank to the outer upper front pillar blank and assembling the outer lowerside sill blank to the outer lower front pillar blank and to the outer center pillar blank in order to form the substantially planar door frame outer reinforcement blank;

the outer lowerside sill blank is made of a press hardening steel different than the press hardening steel of the other outer blanks;

the three-dimensional vehicle door frame outer reinforcement element and the three-dimensional vehicle door frame inner reinforcement element are shaped as complementary opened profiles such that a part of the front pillar, the center pillar and the side rail of the vehicle door frame each have a hollow closed section.

A method for producing a vehicle reinforcement structure is also provided comprising at least a vehicle door frame and an underbody reinforcement element, said underbody reinforcement element comprising at least a front transversal beam (and a rear transversal beam parallel to the front transversal beam, said method comprising the following steps:

producing the vehicle door frame by a method according to the present disclosure, producing the underbody reinforcement element, assembling the vehicle door frame to the underbody reinforcement element such that the front pillar of the vehicle door frame is attached to the front transversal beam of the underbody reinforcement element and the center pillar of the vehicle door frame is attached to the rear transversal beam of the underbody reinforcement element.

According to other advantageous aspects of the present disclosure, the method for producing a vehicle reinforcement structure comprises one or more of the following features, considered alone or according to any technically possible combination:

the underbody reinforcement element further comprises an intermediate transversal beam extending between and parallel to the front and rear transversal beams, said intermediate transversal beam being attached to a lowerside sill joining the front pillar to the center pillar of the door frame;

the transversal beams of the underbody reinforcement element are welded to an inner lowerside sill part of the lowerside sill extending between the front transversal beam and the rear transversal beam.

BRIEF SUMMARY OF THE DRAWINGS

Other features and advantages of the present disclosure will be better understood from a reading of the following description, given with reference to the appended drawings, in which.

DETAILED DESCRIPTION

In the following description, the terms inner, outer, front, rear, transversal, longitudinal, vertical and horizontal are construed with reference to the usual orientation of the illustrated elements, parts or structures when assembled on a vehicle structure.

Figure 1:
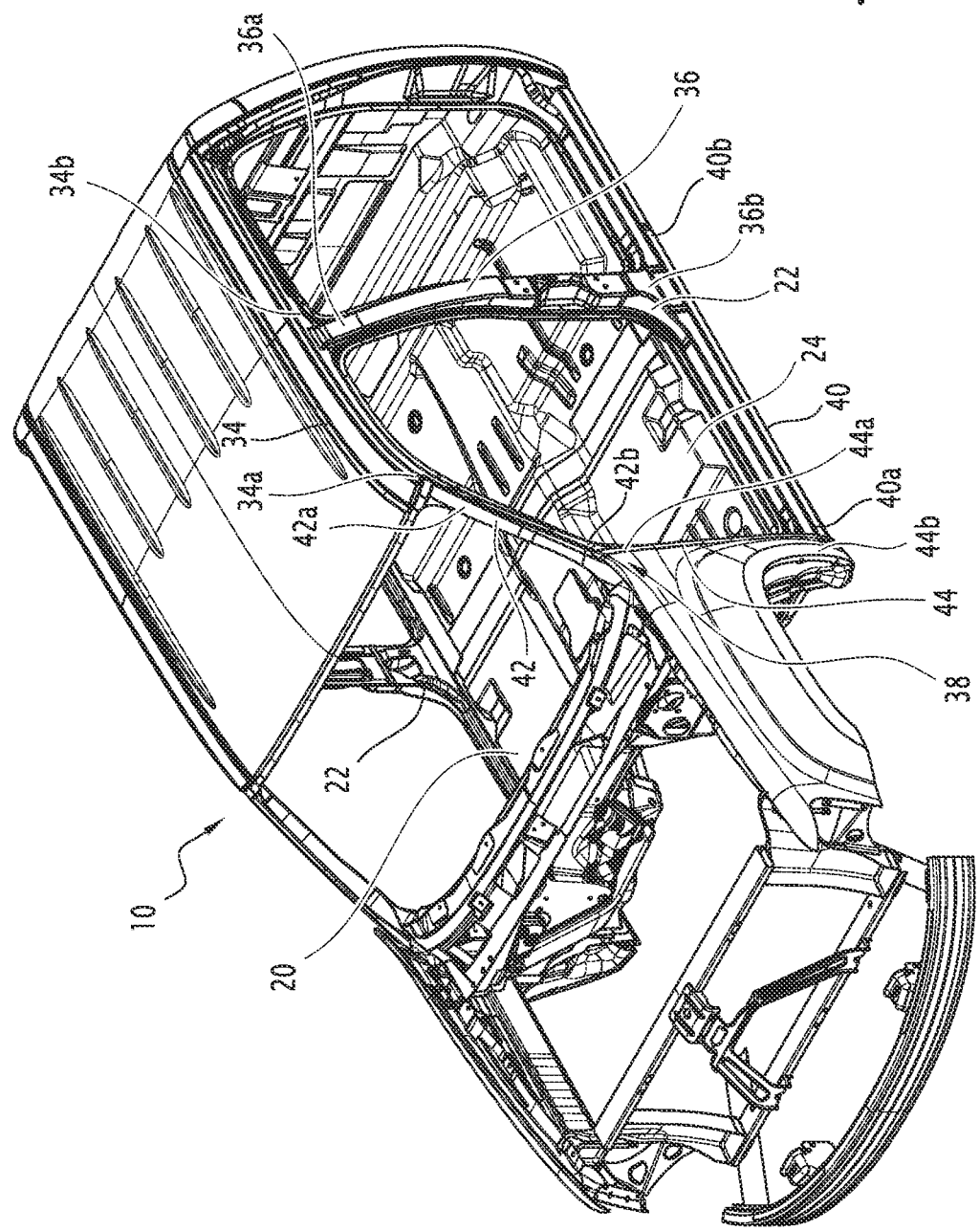
FIG. 1 is a perspective view of a vehicle body according to a particular embodiment.

A vehicle body 10 according to an embodiment of the present disclosure is illustrated on FIG. 1. The vehicle body 10 is a body of a vehicle of the body-on-frame type, for example a pick-up truck. A vehicle of this type comprises a chassis which is separate from the body of the vehicle.

The vehicle body 10 comprises a vehicle underbody structure 20, and, on either side of the vehicle underbody structure 20, a vehicle door frame 22.

Figure 3:
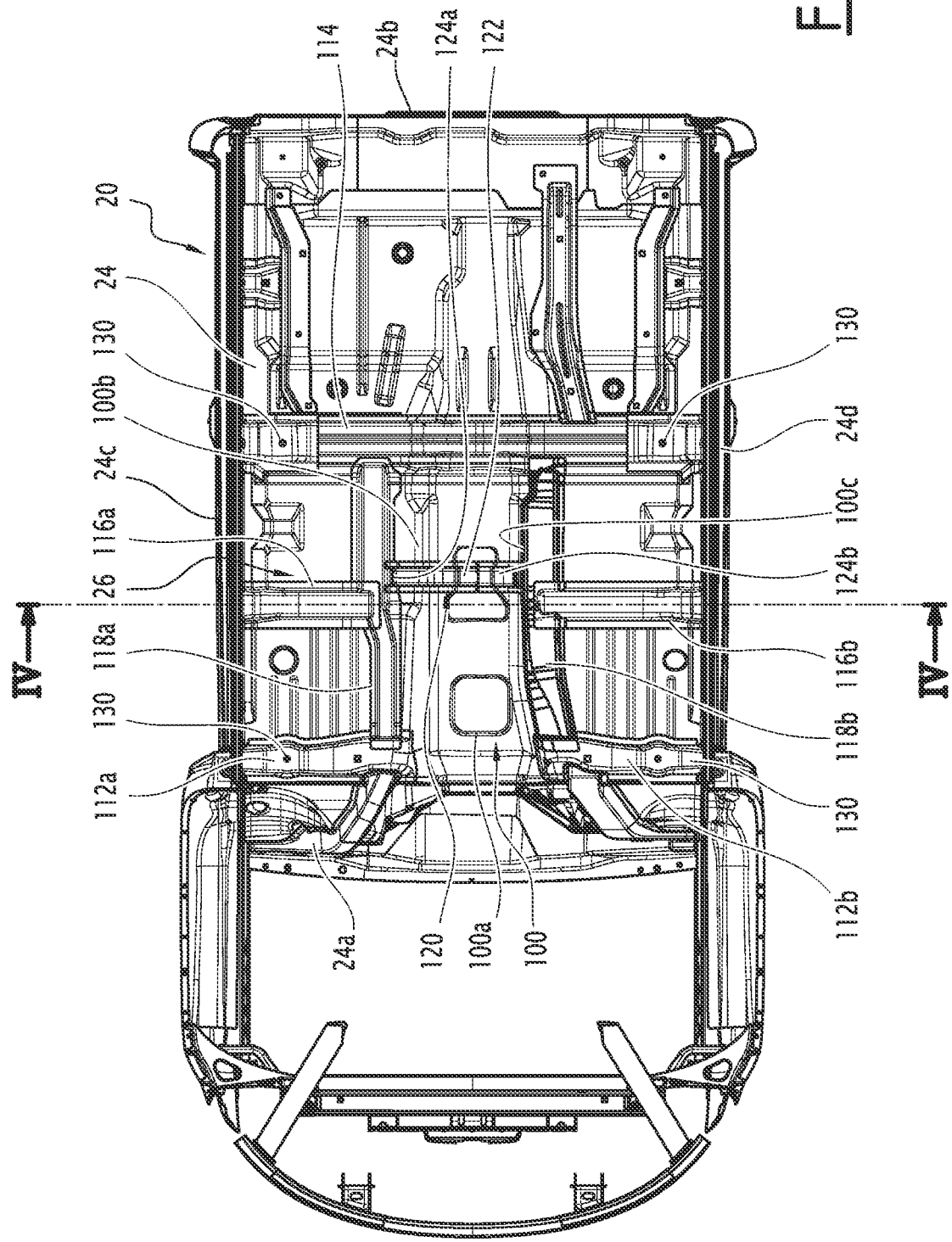
FIG. 3 is a bottom view of the underbody structure of the vehicle body of FIG. 1.

The vehicle underbody structure 20 includes a floor panel 24 and an underbody reinforcement element 26, shown on FIG. 3. The vehicle underbody structure 20 is destined to be connected to the chassis of the vehicle, as described in further details herebelow.

The vehicle door frame 22 and each underbody reinforcement element 26 together form at least part of a vehicle reinforcement structure 30.

The vehicle door frame 22 comprises a side rail 34, a center pillar 36 and a front pillar 38. In the illustrated embodiment, the vehicle door frame 22 further comprises a lowerside sill 40.

The side rail 34 extends substantially horizontally along a longitudinal direction between a front end 34a and a rear end 34b.

The front pillar 38 extends downward from the front end 34a of the side rail 34 along an overall substantially vertical direction. The front pillar 38 comprises an upper front pillar section 42 and a lower front pillar section 44.

The upper front pillar section 42 extends frontward and downward from the front end 34*a* of the side rail 34 in an oblique direction. The upper front pillar section 42 thus extends between an upper end 42*a* contiguous to the front end 34*a* of the side rail 34, and a lower end 42*b*.

The lower front pillar section 44 extends substantially vertically from the lower end 42*b* of the upper front pillar section 42. The lower front pillar section 44 extends between an upper end 44*a*, contiguous to the lower end 42*b* of the upper front pillar section 42, and a lower end 44*b*.

The center pillar 36 extends downward from the side rail 34 along a substantially vertical direction. In the illustrated example, the center pillar 36 extends from an intermediate section of the side rail 34 comprised between the front end 34*a* and the rear end 34*b* of the side rail 34. The center pillar 36 thus extends between an upper end 36*a*, contiguous to the intermediate section of the side rail 34, and a lower end 36*b*.

Thus, the side rail 34 joins the upper ends of the front pillar 38 and the center pillar 36.

The lowerside sill 40 extends substantially along a longitudinal direction between a front end 40*a* and a rear end 40*b*.

The lower end of the front pillar 38 is contiguous to the front end 40*a* of the lowerside sill 40, and the lower end 36*b* of the center pillar 36 is contiguous to an intermediate section of the lowerside sill 40 comprised between the front end 40*a* and the rear end 40*b* of the lowerside sill 40. Thus, the lowerside sill 40 joins the lower ends of the front pillar 38 and the center pillar 36.

Thus, the front pillar 38, the center pillar 36, the side rail 34 and the lowerside sill 40 define a door opening. Indeed, the vehicle door frame 22 is destined to receive a vehicle door, which, when closed, fills the door opening.

Figure 2:
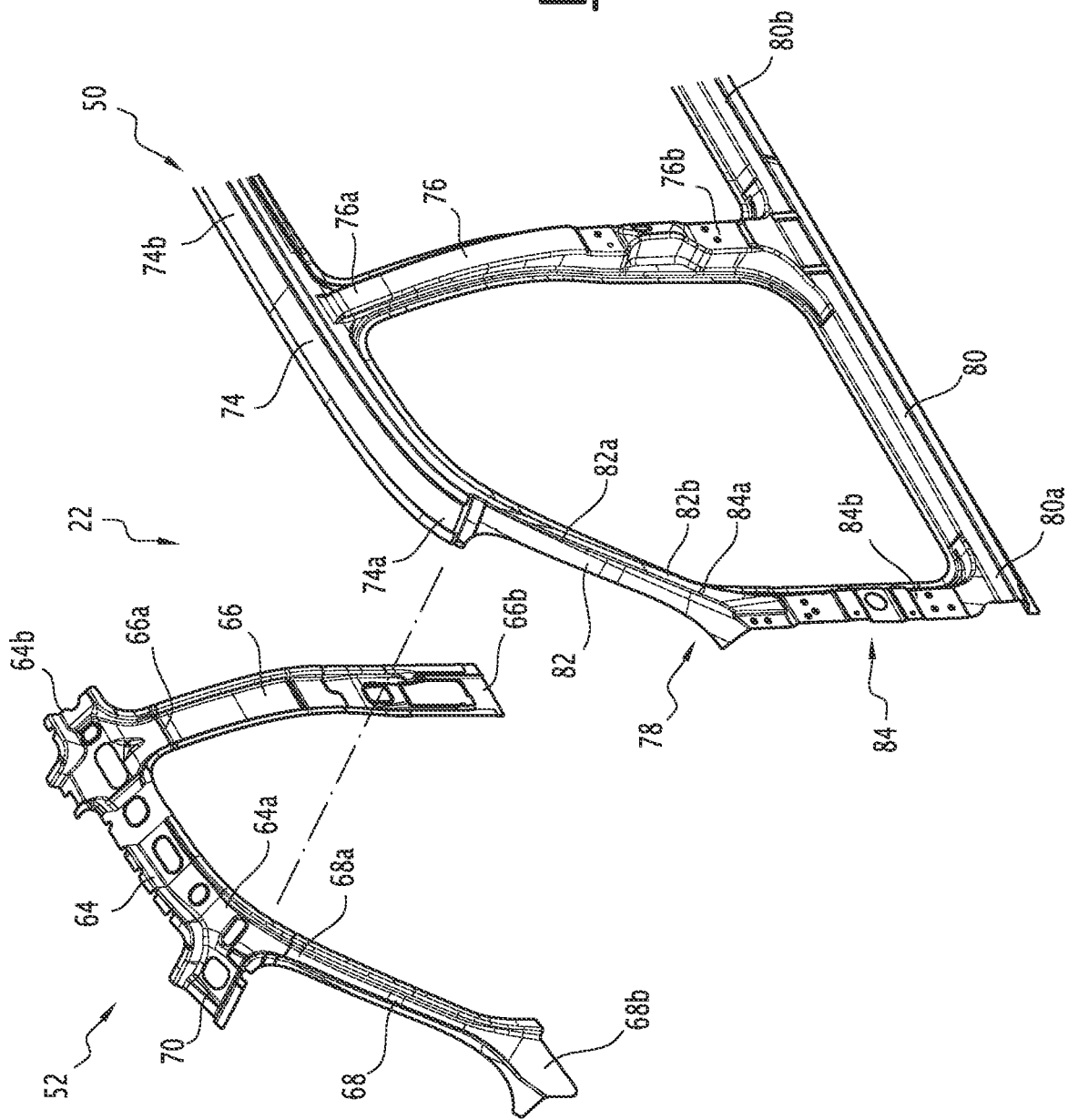
FIG. 2 shows an exploded perspective view of a vehicle door frame of the vehicle body of FIG. 1.

As illustrated on FIG. 2, the vehicle door frame 22 is formed by the assembly of a vehicle door frame outer reinforcement element 50 and of a vehicle door frame inner reinforcement element 52.

The vehicle door frame inner reinforcement element 52 and the vehicle door frame outer reinforcement element 50 each are three-dimensional elements.

The vehicle door frame inner reinforcement element 52 comprises inner reinforcement parts including an inner side rail part 64, an inner center pillar part 66 and an inner front pillar part 68. The inner reinforcement parts further include a roof reinforcement part 70.

Similarly to the side rail 34, the inner side rail part 64 extends substantially horizontally along a longitudinal direction between a front end 64*a* and a rear end 64*b*.

Similarly to the center pillar 36, the inner center pillar part 66 extends downward from the inner side rail part 64 along a substantially vertical direction. In the illustrated example, the inner center pillar part 66 extends from an intermediate section of the inner side rail part 64 comprised between the front end 64*a* and the rear end 64*b* of the inner side rail part 64. The inner center pillar part 66 thus extends between an upper end 66*a* contiguous to the intermediate section of the inner side rail part 64, and a lower end 66*b*.

The inner front pillar part 68 extends frontward and downward from the front end 64*a* of the inner side rail part 64 in an oblique direction. The inner front pillar part 68 thus extends between an upper end 68*a* contiguous to the front end of the side rail 34, and a lower end 68*b*. Preferably, the lower end 68*b* is comprised in a horizontal plane higher than the horizontal plane comprising the lower end of the front pillar 38, i.e. the inner front pillar part 68 does not extend along the whole length of the front pillar 38, and for example only extends along the length of the upper front pillar section 42.

Thus, the inner side rail part 64 joins the inner front pillar part 68 and the inner center pillar part 66.

The roof reinforcement part 70 extends in a substantially horizontal plane inwardly from the front end 64*a* of the inner side rail part 64, in a direction substantially perpendicular to the inner front pillar part 68 and to the inner side rail part 64.

The roof reinforcement part 70 is destined to support a roof front rail element.

The roof reinforcement part 70 is for example made integral with the inner side rail part 64.

At least part of the inner reinforcement parts are made of a press hardened steel. For example, all the inner reinforcement parts are made of a press hardened steel. The inner reinforcement parts may be made of different press hardened steels.

Preferably, the press hardened steel has a tensile strength greater than or equal to 1300 MPa.

For example, the press-hardened steel has a composition comprising, in % weight, 0.10%≤C≤0.5%, 0.5%≤Mn≤3%, 0.1%≤Si≤1%, 0.01%≤Cr≤1%, Ti≤0.2%, Al≤0.1%, S≤0.05%, P≤0.1%, 0.0005%≤B≤0.010%, the remainder consisting of iron and unavoidable impurities resulting from the production.

The press hardened steel is for example Usibor®, in particular Usibor® 1500.

The steel may be coated or uncoated, for example galvannealed or galvanized by any suitable process such as hot dip coating, electrodeposition, vacuum coating.

In particular, the press hardened steel has preferably a structure consisting essentially of ferrite and perlite before the steel is hot stamped, and a structure consisting essentially of martensite after hot stamping.

The vehicle door frame inner reinforcement element 52 has an overall thickness, defined as the smallest dimension of the vehicle door frame inner reinforcement element 52, for example comprised between 0.7 mm and 1.3 mm.

Preferably, at least one of the inner reinforcement parts has a thickness different from the thickness of the other inner reinforcement parts. For example, the thicknesses of the inner side rail part 64, the inner center pillar part 66 and the inner front pillar part 68 differ one from each other.

Each inner reinforcement part has a thickness adapted to the final position of the part in the vehicle and to the resistance to be achieved.

For example, the inner side rail part 64, together with the roof reinforcement part 70, has a thickness substantially equal to 1 mm. The inner front pillar part 68 has a thickness substantially equal to 0.9 mm. The inner center pillar part 66 has a thickness substantially equal to 1.1 mm.

The vehicle door frame outer reinforcement element 50 comprises outer reinforcement parts including an outer side rail part 74, an outer center pillar part 76 and an outer front pillar part 78. The outer reinforcement parts further include an outer lowerside sill part 80.

Similarly to the side rail 34, the outer side rail part 74 extends substantially horizontally along a longitudinal direction between a front end 74*a* and a rear end 74*b*.

Similarly to the center pillar 36, the outer center pillar part 76 extends downward from the outer side rail part 74 along a substantially vertical direction. In the illustrated example, the outer center pillar part 76 extends from an intermediate section of the outer side rail part 74 comprised between the front end 74*a* and the rear end 74*b* of the outer side rail part 74. The outer center pillar part 76 thus extends between an upper end 76a, contiguous to the intermediate section of the outer side rail part 74, and a lower end 76b.

Similarly to the front pillar 38, the outer front pillar part 78 extends downward from the front end 74a of the outer side rail part 74 along an overall substantially vertical direction. The outer front pillar part 78 comprises an outer upper front pillar part 82 and an outer lower front pillar part 84.

The outer upper front pillar part 82 extends frontward and downward from the front end 74a of the outer side rail part 74 in an oblique direction. The outer upper front pillar part 82 thus extends between an upper end 82a contiguous to the front end 74a of the outer side rail part 74, which is the upper end of the outer front pillar part 78, and a lower end 82b.

The outer lower front pillar part 84 extends substantially vertically from the lower end of the outer upper front pillar part 82. The outer lower front pillar part 84 extends between an upper end 84a, contiguous to the lower end 82b of the outer upper front pillar part 82, and a lower end 84b, which is the lower end of the outer front pillar part 78.

Thus, the outer side rail part 74 joins the outer front pillar part 78 and the outer center pillar part 76.

Similarly to the lowerside sill 40, the outer lowerside sill part 80 extends substantially along a longitudinal direction between a front end 80a and a rear end 80b.

The lower end 84b of the outer front pillar part 78 is contiguous to the front end 76a of the outer lowerside sill part 80, and the lower end 76b of the outer center pillar part 76 is contiguous to an intermediate section of the outer lowerside sill part 80 comprised between the front end 80a and the rear end 80b of the outer lowerside sill part 80. Thus, the outer lowerside sill part 80 joins the outer lower front pillar part 84 to the outer center pillar part 76.

At least part of the outer reinforcement parts are made of a press hardened steel. For example, all the outer reinforcement parts are made of a press hardened steel.

Preferably, the press hardened steel has a tensile strength higher than or equal to 1300 MPa.

For example, the press-hardened steel has a composition comprising, in % weight, 0.10%≤C≤0.5%, 0.5%≤Mn≤3%, 0.1%≤Si≤1%, 0.01%≤Cr≤1%, Ti≤0.2%, Al≤0.1%, S≤0.05%, P≤0.1%, 0.0005%≤B≤0.010%, the remainder consisting of iron and unavoidable impurities resulting from the production.

The press hardened steel is for example Usibor®, in particular Usibor® 1500.

The steel may be coated or uncoated, for example galvannealed or galvanized by any suitable process such as hot dip coating, electrodeposition, vacuum coating.

The outer reinforcement parts may be made of different press hardened steels. For example, the outer lowerside sill part 80 may be made of a press hardened steel different from the other outer parts. In particular, the outer lowerside sill part 80 may be made of Ductibor®, and the other outer reinforcement parts are made of Usibor®.

However, the outer reinforcement parts are preferably all made of the same press hardened steel, so that when subjected to an external stress, the distribution of the deformation is homogeneous within the outer reinforcement element 50.

In particular, the press hardened steel has preferably a structure consisting essentially of ferrite and perlite before the steel is hot stamped, and a structure consisting essentially of martensite after hot stamping.

The door frame outer reinforcement element 50 has an overall thickness, defined as the smallest dimension of the door frame outer reinforcement element 50, for example comprised between 0.8 mm and 2.5 mm.

Preferably, at least one of the outer reinforcement parts has a thickness different from the thickness of the other outer reinforcement parts. For example, the thicknesses of the outer side rail part 74, the outer center pillar part 76 and the outer front pillar part 78 differ one from each other.

Each outer part has a thickness adapted to the final position of the part in the vehicle and to the resistance to be achieved.

For example, the outer side rail part 74 has a thickness substantially equal to 1.1 mm, the outer upper front pillar part 82 has a thickness substantially equal to 0.9 mm, and the outer lower front pillar part 84 has a thickness substantially equal to 1.1 mm. According to this example, the outer center pillar part 76 has a thickness substantially equal to 2 mm and the outer lowerside sill part 80 has a thickness substantially equal to 1.2 mm.

The door frame outer reinforcement element 50 and the door frame inner reinforcement element 52 have complementary shapes such that, once assembled, the door frame outer reinforcement element 50 and the door frame inner reinforcement element 52 form the vehicle door frame 22.

In particular, the side rail 34 is formed by the assembly of the inner side rail part 64 and the outer side rail part 74, and the center pillar 36 is formed by the assembly of the inner center pillar part 66 and the outer center pillar part 76.

Furthermore, the front pillar 38 is formed by the assembly of the inner front pillar part 68 and the outer front pillar part 78. More specifically, the upper front pillar section 42 is formed by the assembly of the inner front pillar part 68 and the outer upper front pillar part 82.

In the illustrated example, the lower front pillar section 44 is formed by the outer lower front pillar part 84.

The vehicle door frame outer reinforcement element 50 and the vehicle door frame inner reinforcement element 52 are shaped as complementary opened profiles such that a part of the front pillar 38, the center pillar 36 and the side rail 34 of the vehicle door frame 22 each have a hollow closed section.

In particular, the outer reinforcement parts have an open cross-section. The open cross-section comprises at least a bottom segment and two wall segments extending from either ends of the bottom segment.

A method for producing the vehicle door frame 22 will now be described.

The production of the vehicle door frame 22 comprises producing the door frame inner reinforcement element 52, producing the door frame outer reinforcement element 50, and assembling the door frame inner reinforcement element 52 to the door frame outer reinforcement element 50.

The vehicle door frame inner reinforcement element 52 is produced by hot stamping an inner reinforcement blank, which is itself formed by assembling several blanks.

The production of the vehicle door frame inner reinforcement element 52 thus comprises a step of formation of a substantially planar door frame inner reinforcement blank. The shape of the door frame inner reinforcement blank is adapted so that it may be hot stamped to form the inner reinforcement element having the desired shape.

The inner reinforcement blank is preferably a tailor welded blank.

The formation of the inner reinforcement blank comprises providing an inner center pillar blank, an inner front pillar blank and an inner side rail blank, said inner blanks being substantially planar. Preferably, the formation of the inner reinforcement blank further comprises providing a roof reinforcement blank made integral with the inner side rail blank.

The shapes and thicknesses of the inner blanks are adapted so that, once hot stamped, the inner center pillar blank, the inner front pillar blank, the inner side rail blank and the roof reinforcement blank may form the inner center pillar part 66, the inner front pillar part 68, the inner side rail part 64 and the roof reinforcement part 70 respectively.

The inner blanks are for example obtained by cutting steel sheets, for example sheets made of a press hardening steel such as Usibor®, to the desired shapes.

The inner center pillar blank and the inner front pillar blank are then assembled to the inner side rail blank to form the inner reinforcement blank.

In particular, an upper end of the inner front pillar blank is assembled to a front end of the inner side rail blank and an upper end of the inner center pillar blank is assembled to an intermediate section of the inner side rail blank.

Preferably, the inner blanks are assembled by means of welding, more preferably by laser welding, such that the inner blanks are joined together by continuous weld lines.

In particular, the inner center pillar blank and the inner front pillar blank are joined to the inner side rail blank by continuous weld lines.

The production of the vehicle door frame inner reinforcement element 52 then comprises a step of hot stamping the door frame inner reinforcement blank to shape the three-dimensional vehicle door frame inner reinforcement element 52.

If the inner blanks are made of a press hardening steel, the hot stamping results in a hardening of the steel.

In particular, as stated above, the press hardened steel has preferably a structure consisting essentially of ferrite and perlite before the steel is hot stamped, and a structure consisting essentially of martensite after hot stamping and quenching.

Similarly, the door frame outer reinforcement element 50 is produced by hot stamping an outer reinforcement blank, which is itself formed by assembling several blanks.

The production of the door frame outer reinforcement element 50 thus comprises a step of formation of a substantially planar door frame outer reinforcement blank. The shape of the door frame outer reinforcement blank is adapted so that it may be hot stamped to form the outer reinforcement element having the desired shape.

The outer reinforcement blank is preferably a tailor welded blank.

The formation of the outer reinforcement blank comprises providing an outer center pillar blank, an outer upper front pillar blank, an outer lower front pillar blank, an outer side rail blank, and an outer lowerside sill blank, said outer blanks being substantially planar.

The shapes and thicknesses of the outer blanks are adapted so that, once hot stamped, the outer center pillar blank, the outer upper front pillar blank, the outer lower front pillar blank, the outer side rail blank and the outer lowerside sill blank may form the outer center pillar part 76, the outer upper front pillar part 82, the outer lower front pillar part 84, the outer side rail part 74 and the outer lowerside sill part 80 respectively.

The outer blanks are for example obtained by cutting steel sheets, for example sheets made of a press hardening steel such as Usibor®, to the desired shapes.

The outer center pillar blank and the outer upper front pillar blank are then assembled to the outer side rail blank, the outer lower front pillar blank is assembled to the outer upper front pillar blank, and the outer lowerside sill blank is assembled to the outer lower front pillar blank and to the outer center pillar blank, so as to form the outer reinforcement blank.

In particular, an upper end of the outer upper front pillar blank is assembled to a front end of the outer side rail blank and an upper end of the outer center pillar blank is assembled to an intermediate section of the outer side rail blank. Furthermore, a lower end of the outer upper front pillar blank is assembled to an upper end of the outer lower front pillar blank, a lower end of the outer lower front pillar blank is assembled to a front end of the outer lowerside sill blank, and a lower end of the outer center pillar blank is assembled to an intermediate section of the outer lowerside sill blank.

Preferably, the outer blanks are assembled by means of welding, more preferably by laser welding, such that the outer blanks are joined together by continuous weld lines.

The production of the door frame outer reinforcement element 50 then comprises a step of hot stamping the door frame outer reinforcement blank to shape the three-dimensional vehicle door frame outer reinforcement element 50.

If the outer blanks are made of a press hardening steel, the hot stamping results in a hardening of the steel.

The door frame inner reinforcement element 52 and the door frame outer reinforcement element 50 are then assembled, for example by welding.

The use of a press hardening steel for the inner and outer blanks thus provides both a good formability for the blanks so that the door frame inner and outer reinforcement blanks may be hot stamped to shape the vehicle door frame inner and outer reinforcement elements without obtaining necking or thickening of the steel, and a ultra high strength for the vehicle door frame inner and outer reinforcement elements once hot stamped.

Assembling the inner blanks (respectively the outer blanks) to form the door frame inner reinforcement blank (respectively the door frame outer reinforcement blank) before hot stamping the door frame inner reinforcement blank (respectively the door frame outer reinforcement blank) allows the use of a single press for shaping the whole vehicle door frame inner reinforcement element 52 (respectively the whole door frame outer reinforcement element 50), which reduces the cost of the production of the vehicle door frame inner 52 and outer 50 reinforcement elements.

Moreover, the formation of the door frame inner reinforcement blank (respectively the door frame outer reinforcement blank) by assembling several inner blanks (respectively several outer blanks) allows having a varying thickness between the different parts of the vehicle door frame inner reinforcement element 52 (respectively the door frame outer reinforcement element 50), and further allows the reduction of material use thanks to improved nesting.

Furthermore, assembling the inner blanks (respectively the outer blanks) to form the door frame inner reinforcement blank (respectively the door frame outer reinforcement blank) before hot stamping the door frame inner reinforcement blank (respectively the door frame outer reinforcement blank) allows using laser welding to assemble the inner blanks (respectively the outer blanks), instead of spot welding. Laser welding provides a continuous weld line between the blanks, and consequently provides a better resistance, and thus a better crash resistance, than spot welding.

Referring now to FIG. 3, the vehicle underbody structure 20 includes a floor panel 24 and an underbody reinforcement element 26.

The floor panel 24 generally extends along a horizontal plane. The floor panel 24 extends longitudinally between a front side 24a and a rear side 24b, and transversally between a right side 24c and a left side 24d.

The floor panel 24 comprises a longitudinal floor tunnel 100 forming a recess in the floor panel 24, opening downwardly. The floor tunnel 100 extends from the front side 24a of the floor panel 24 towards the rear side 24b, between two side floor parts.

The floor tunnel 100 comprises a substantially horizontal upper wall 100a and two substantially longitudinal vertical side walls 100b, 100c. Each side wall 100b, 100c extends between an upper end, contiguous to the upper wall, and a lower end, contiguous to one of the side floor parts.

The floor panel 24 is for example made of a steel.

The underbody reinforcement element 26 is attached to the lower side floor panel 24 and is destined to provide resistance to the vehicle underbody structure 20.

The underbody reinforcement element 26 comprises a mesh of beams destined to absorb stress when the vehicle is subjected to an impact. In particular, the underbody reinforcement element 26 is destined to absorb stress received by a door ring, for example during a side impact.

The underbody reinforcement element 26 thus comprises several reinforcement beams attached to the floor panel 24.

In particular, the reinforcement beams comprise at least a front transversal beam and a rear transversal beam, the front and rear transversal beams extending parallel to each other.

In the illustrated example, the reinforcement beams comprise two front transversal beams 112a, 112b and a single rear transversal beam 114.

The reinforcement beams further comprise two intermediate transversal beams 116a, 116b, two longitudinal beams 118a, 118b and a tunnel transversal beam 120.

The two front transversal beams 112a, 112b extend transversally in the front part of the floor panel 24, on either side of the floor tunnel 100. Indeed, each front transversal beam 112a, 112b extends between an inner end contiguous to a lower end of a side wall 100b, 100c of the floor tunnel 100 and an outer end contiguous to a side 24c, 24d of the floor panel 24.

The rear transversal beam 114 extends in a central part of the floor panel 24, parallel to the front transversal beams 112a, 112b. The rear front transversal beam 114 thus extends between the right 24c and left 24d sides of the floor panel 24.

More specifically, the front transversal beams 112a, 112b and the rear transversal beam 114 are configured so that, when the vehicle underbody structure 20 is assembled to the door frame 22, the outer ends of each front transversal beam 112a, 112b may join the front pillar 38 of a door frame 22, and each end of the rear transversal panel may join the center pillar 36 of a door frame 22.

The two intermediate transversal beams 116a, 116b extend between and parallel to the front transversal beams 112a, 112b and the rear transversal beam 114, on either side of the floor tunnel 100. Each intermediate transversal beam 116a, 116b extends between an inner end contiguous to a lower end of a side wall of the floor tunnel 100 and an outer end contiguous to a side of the floor panel 24.

For example, the intermediate transversal beams 116a, 116b extend substantially halfway between the front transversal beams 112a, 112b and the rear transversal beam 114.

Thus, the intermediate transversal beams 116a, 116b are configured so that, when the vehicle underbody structure 20 is assembled to the door frame 22, the outer end of each intermediate transversal beam 116a, 116b may join the lowerside sill 40 of a door frame 22.

The two longitudinal beams 118a, 118b extend longitudinally on either side of the floor tunnel 100. Each longitudinal beam 118a, 118b extends between a front end contiguous to a front transversal beam 112a, 112b and a rear end contiguous to the rear transversal beam 114. Thus, each longitudinal beam 118a, 118b joins one of the front transversal beams 112a, 112b to the rear transversal beam 114.

Furthermore, each longitudinal beam 118a, 118b comprises an intermediate section which is contiguous to an inner end of an intermediate transversal beam 116a, 116b. Thus, each longitudinal beam 118a, 118b joins one of the front transversal beams 112a, 112b to an intermediate transversal beam 116a, 116b and to the rear transversal beam 114.

The tunnel transversal beam 120 extends from one longitudinal beam 118a to the other longitudinal beam 118b and across the floor tunnel 100. The tunnel transversal beam 120 thus comprises a center region 122 crossing the floor tunnel 100 and comprised between two ends 124a, 124b joining the longitudinal beams 118a. The center region 120a of the tunnel transversal beam 120 comprises a substantially horizontal upper wall, attached to the floor tunnel 100 upper wall, and two substantially longitudinal vertical side walls, each attached to a floor tunnel 100 side wall.

Preferably, the tunnel transversal beam 120 is not transversally aligned with the intermediate transversal beams 116a, 116b, so that a longitudinal offset exists between the tunnel transversal beam 120 and the intermediate transversal beams 116a, 116b.

Owing to this offset, stress received by the intermediate transversal beams 116a, 116b is not directly transmitted to the tunnel transversal beam 120, but is transmitted through the longitudinal beams 118a, 118b. Indeed, since the tunnel transversal beam 120 is not straight, it does not work in compression but in flexion when submitted to a transversal stress, and thus bends more easily than a straight beam. The offset between the tunnel transversal beam 120 and the intermediate transversal beams 116a, 116b thus allows reducing the risks of bending the tunnel transversal beam 120.

Each front transversal beam 112a, 112b and the rear transversal beam 114 are provided with slots 130 for receiving a connection element, also called body mount, destined to connect the vehicle underbody structure 20 to a chassis.

Preferably, the underbody reinforcement element 26 is made of a steel (or several different steels) different from the steel forming the floor tunnel 100, and having a tensile strength higher than the steel forming the floor tunnel 100.

Preferably, at least some of the reinforcement beams are made of a steel having a tensile strength higher than or equal to 1300 MPa. For example, the steel is a press hardening steel, which, once pressed, has a tensile strength higher than or equal to 1300 MPa.

For example, the press-hardened steel has a composition comprising, in % weight, 0.10%≤C≤0.5%, 0.5%≤Mn≤3%, 0.1%≤Si≤1%, 0.01%≤Cr≤1%, Ti≤0.2%, Al≤0.1%, S≤0.05%, P≤0.1%, 0.0005%≤B≤0.010%, the remainder consisting of iron and unavoidable impurities resulting from the production.

The press hardened steel is for example Usibor®, in particular Usibor® 1500 or Usibor® 2000.

The steel may be coated or uncoated, for example galvannealed or galvanized by any suitable process such as hot dip coating, electrodeposition, vacuum coating.

In particular, the press hardened steel has preferably a structure consisting essentially of ferrite and perlite before the steel is pressed, and a structure consisting essentially of martensite after pressing.

The underbody reinforcement element 26 has an overall thickness, defined as the smallest dimension of the underbody reinforcement element 26, for example comprised between 0.7 mm and 1.5 mm.

Preferably, at least one of the reinforcement beams has a thickness different from the thickness of the other beams. For example, the thicknesses of the front transversal beams 112a, 112b, the rear transversal beam 114, the intermediate transversal beams 116a, 116b, the longitudinal beams 118a, 118b and the tunnel transversal beam 120 differ one from each other.

Each reinforcement beam has a thickness adapted to the position of the beam and to the resistance to be achieved.

Preferably, the tunnel transversal beam 120 has a thickness higher than the other beams, due to the non straight geometry of this beam, in particular in order to avoid bending of the tunnel transversal beam 120.

For example, the front transversal beams 112a, 112b have a thickness substantially equal to 1.2 mm, and the rear transversal beam 114 has a thickness substantially equal to 1.2 mm. The intermediate transversal beams 116a, 116b have for example a thickness substantially equal to 1.3 mm, the longitudinal beams 118a, 118b have for example a thickness substantially equal to 1.2 mm, and the tunnel transversal beam 120 has for example a thickness substantially equal to 1.5 mm.

The reinforcement beams have an open cross-section, so that the underbody reinforcement element 26 forms an opened profile. The open cross-section of each reinforcement beam comprises at least a bottom segment and two wall segments extending from either ends of the bottom segment.

The underbody reinforcement element 26 is attached to the floor panel 24 such that the floor panel 24 closes the opened profile.

Preferably, the underbody reinforcement element 26 and the floor panel 24 are attached by welding, for example spot welding.

The production of the vehicle underbody structure 20 comprises the production of the floor panel 24, the production of the underbody reinforcement element 26, and the assembling of the underbody reinforcement element 26 to the floor panel 24 so as to form the vehicle underbody structure 20.

The floor panel 24 is for example produced by stamping of a substantially rectangular blank.

The underbody reinforcement element 26 is produced by forming and shaping each reinforcement beam and by assembling the reinforcement beams so as to form the underbody reinforcement element 26.

The production of the underbody reinforcement element 26 thus comprises a step of formation of substantially planar reinforcement beam blanks.

The formation of the reinforcement beam blanks comprises the formation of two front transversal beam blanks, a rear transversal beam blank, two intermediate transversal beam blanks, two longitudinal beam blanks and a tunnel transversal beam blank.

The shapes and thicknesses of the reinforcement beam blanks are adapted so that, once hot stamped, the front transversal beam blanks, the rear transversal beam blank, the intermediate transversal beam blanks, the longitudinal beam blanks and the tunnel transversal beam blank may form the front transversal beams 112a, 112b, the rear transversal beam 114, the intermediate transversal beams 116a, 116b, the longitudinal beams 118a, 118b and the tunnel transversal beam 120 respectively.

The reinforcement beam blanks are for example obtained by cutting steel sheets, for example sheets made of a press hardening steel such as Usibor®, to the desired shapes.

The reinforcement beam blanks are then hot stamped so as to shape the reinforcement beams, and subsequently quenched.

The reinforcement beams are then assembled to form the underbody reinforcement element 26.

In particular, the front end of each longitudinal beam 118a, 118b is assembled to the inner end of a front transversal beam 112a, 112b, an intermediate section of each longitudinal beam 118a, 118b is assembled to the inner end of an intermediate transversal beam 116a, 116b, and the rear end of each longitudinal beam 118a, 118b is assembled to the rear transversal beam 114.

Furthermore, each end of the tunnel transversal beam 120 is assembled to a longitudinal beam 118a, 118b.

Preferably, the reinforcement beams are assembled by means of welding, for example by spot welding or laser welding.

The use of a press hardening steel for at least part of the underbody reinforcement element 26 provides both a good formability for the reinforcement beam blanks so that the reinforcement beam blanks may be hot stamped to shape the reinforcement beams without obtaining compression or thickening of the steel, and a ultra high strength for the reinforcement beams once hot stamped and quenched.

The use of a press hardening steel having a tensile strength higher than or equal to 1300 MPa provides an improved resistance to impacts, in particular side impacts, without requiring thickening the beams, and thus without increasing the weight of the vehicle underbody structure.

The vehicle body 10 is formed by the assembly of the vehicle underbody structure 20 and at least one vehicle door frame 22 on one side of the vehicle underbody structure 20, preferably two vehicle door frames 22 on either side of the vehicle underbody structure 20. The assembling of the vehicle body 10 will now be described with a reference to one vehicle door frame 22, on one side of the vehicle underbody structure 20, but it will be understood that a second vehicle door frame 22 may be assembled in the same way to the other side of the vehicle underbody structure 20

The vehicle door frame 22 is attached to the vehicle underbody structure 20 on a side of the vehicle underbody structure 20, preferably such that the front pillar 38 is attached to a front transversal beam 112a of the underbody reinforcement element 26 and the center pillar 36 is attached to the rear transversal beam 114 of the underbody reinforcement element 26. Furthermore, an intermediate transversal beam 116a is attached to the lowerside sill 40.

Thus, the energy of an impact received by the vehicle door frame 22, in particular by the front and center pillars, can be efficiently transmitted to the vehicle underbody structure 20.

Figure 4:
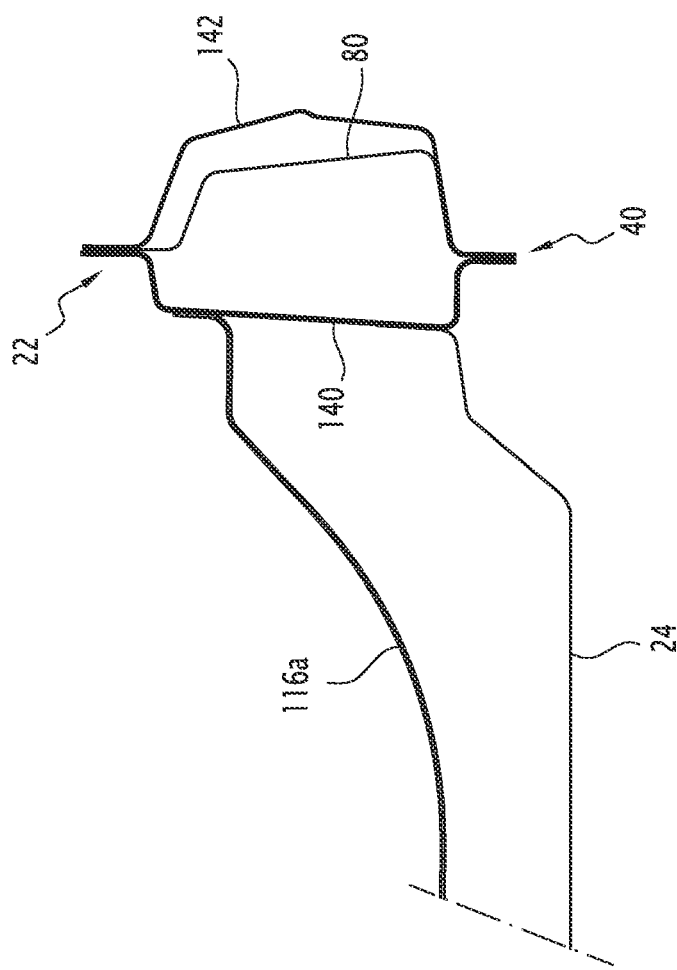
FIG. 4 shows a cross-section along line IV-IV of FIG. 3 of an assembly of the vehicle door frame and the underbody structure.
Figure 4:
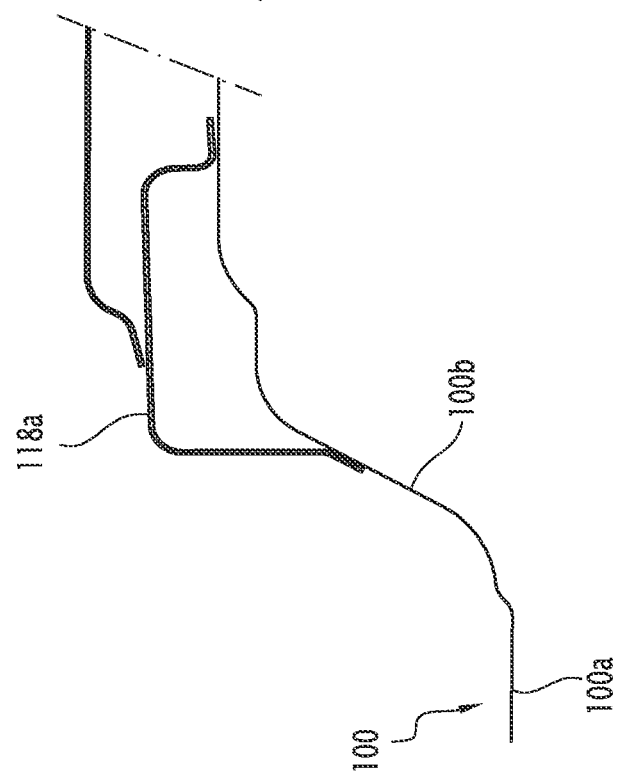

Preferably, the transversal beams 112a, 114 and 116a are attached to the vehicle door frame 22 by means of an inner lowerside sill part 140 (FIG. 4), forming a joining steel sheet, which extends between the front transversal beam 112a and the rear transversal beam 114. For example, the transversal beams 112a, 114 and 116a are attached to the vehicle door frame 22 by welding.

The inner lowerside sill part 140 extends extends substantially along a longitudinal direction. The inner lowerside sill part 140 is assembled, for example by welding, to the outer lowerside sill part 80 to form the lowerside sill 40. The inner lowerside sill part 140 has a shape complementary to that of the outer lowerside sill part 80 such that, when the joining steel sheet 140 and the outer lowerside sill part 80 are assembled, they form the lowerside sill 40, and such that the lowerside sill 40 has a hollow closed section.

The inner lowerside sill part 140 is for example made of a steel having a fully martensitic microstructure, and having a tensile strength preferably higher than or equal to 1700 MPa. The steel forming the inner lowerside sill part 140 is for example MS1700®.

The outer lowerside sill part 80 is itself covered by an outer ornament panel 142.

Thus formed, the vehicle underbody structure improves the resistance of the vehicle in case of an impact, in particular a side impact. In particular, the position of the front and rear transversal beams, facing the front pillar 38 and the center pillar 36 respectively, allows distributing the stress received by the vehicle during the impact, and provides an efficient support to the front and center pillars. Furthermore, the intermediate transversal beam 116a, facing the lowerside sill 40 may absorb energy in case of a side impact occurring between the front and center pillars, and thus limits the risks of intrusion in the vehicle compartment in case of a side impact.

It must be understood that the example embodiments presented above are not limiting.

What is claimed is:

1. A method for producing a vehicle door frame including at least a front pillar, a center pillar and a side rail, formed by the assembly of a three-dimensional vehicle door frame outer reinforcement element and of a three-dimensional vehicle door frame inner reinforcement element, the method comprising:
producing a three-dimensional vehicle door frame outer reinforcement element;
producing a three-dimensional vehicle door frame inner reinforcement element, the door frame inner reinforcement element including at least an inner center pillar part, an inner front pillar part and an inner side rail part, the inner side rail part joining the inner center pillar part and the inner front pillar part, and
assembling the door frame outer reinforcement element and the door frame inner reinforcement element to form the vehicle door frame,
the producing of the three-dimensional vehicle door frame inner reinforcement element comprising:
providing inner blanks, one of said inner blanks being an inner center pillar blank, another one of said inner blanks being an inner front pillar blank and a third one of said inner blanks being an inner side rail blank, the inner blanks being planar;
assembling the inner center pillar blank and the inner front pillar blank to the inner side rail blank in order to form a planar door frame inner reinforcement blank; and
hot stamping the planar door frame inner reinforcement blank to shape the three-dimensional door frame inner reinforcement element,
the inner front pillar part extending frontward and downward from the inner side rail part to a lowermost end comprised in a horizontal plane higher than a horizontal plane comprising a lowermost end of the front pillar.

2. The method as recited in claim 1 wherein the inner blanks are made of a press hardening steel.

3. The method as recited in claim 2 wherein the press hardening steel has a composition, in percent weight:
0.10%≤C≤0.5%;
0.50%≤Mn≤3%;
0.10%≤Si≤1%;
0.01%≤Cr≤1%;
Ti≤0.2%;
Al≤0.1%;
S≤0.05%;
P≤0.1%;
0.005%≤B≤0.010%; and
a remainder comprising iron and impurities resulting from production.

4. The method as recited in claim 2 wherein the press hardening steel has a tensile strength greater than or equal to 1300 MPa after the hot stamping step.

5. The method as recited in claim 1 wherein the inner center pillar blank and the inner front pillar blank are assembled to the inner side rail blank by laser welding such that the inner center pillar blank and the inner front pillar blank are each joined to the inner side rail blank by a continuous weld line.

6. The method as recited in claim 1 wherein the door frame outer reinforcement element comprises at least an outer center pillar part, an outer upper front pillar part and an outer side rail part joining the outer center pillar part and the outer upper front pillar part, wherein producing the three-dimensional vehicle door frame outer reinforcement element comprises:
providing outer blanks comprising an outer center pillar blank, an outer upper front pillar blank and an outer side rail blank, the outer blanks being planar;
assembling the outer center pillar blank and the outer upper front pillar blank to the outer side rail blank in order to form a planar door frame outer reinforcement blank; and
hot stamping the door frame outer reinforcement blank to shape the three-dimensional vehicle door frame outer reinforcement element.

7. The method as recited in claim 6 wherein the outer blanks are made of a press hardening steel.

8. The method as recited in claim 6 wherein the door frame outer reinforcement element further comprises an outer lower front pillar part joined to the outer upper front pillar part, and an outer lowerside sill part joining the outer lower front pillar part to the outer center pillar part, wherein producing the three-dimensional vehicle door frame outer reinforcement element further comprises:
providing an outer lower front pillar blank and an outer lowerside sill blank, the outer lower front pillar and outer lowerside sill blanks being planar; and
assembling the outer lower front pillar blank to the outer upper front pillar blank, and assembling the outer lowerside sill blank to the outer lower front pillar blank and to the outer center pillar blank in order to form the planar door frame outer reinforcement blank.

9. The method as recited in claim 8 wherein the outer lowerside sill blank is made of a press hardening steel different than the press hardening steel of the other outer blanks.

10. The method as recited in claim 1 wherein the three-dimensional vehicle door frame outer reinforcement element and the three-dimensional vehicle door frame inner reinforcement element are shaped as complementary opened profiles such that a part of the front pillar, the center pillar and the side rail of the vehicle door frame each have a hollow closed section.

11. A method for producing a vehicle reinforcement structure including at least a vehicle door frame and an underbody reinforcement element, the underbody reinforcement element comprising at least a front transversal beam and a rear transversal beam parallel to the front transversal beam, the method comprising:

producing the vehicle door frame by the method as recited in claim 1;

producing the underbody reinforcement element; and assembling the vehicle door frame to the underbody reinforcement element such that the front pillar of the vehicle door frame is attached to the front transversal beam of the underbody reinforcement element and the center pillar of the vehicle door frame is attached to the rear transversal beam of the underbody reinforcement element.

12. The method as recited in claim 11 wherein the underbody reinforcement element further comprises an intermediate transversal beam extending between and parallel to the front and rear transversal beams, the intermediate transversal beam being attached to a lowerside sill joining the front pillar to the center pillar of the door frame.

13. The method as recited in claim 12 wherein the transversal beams of the underbody reinforcement element are welded to an inner lowerside sill part of the lowerside sill extending between the front transversal beam and the rear transversal beam.

14. The method as recited in claim 13, wherein the door frame outer reinforcement element comprises at least an outer center pillar part, an outer upper front pillar part and an outer side rail part joining the outer center pillar part and the outer upper front pillar part, wherein producing the three-dimensional vehicle door frame outer reinforcement element comprising:

providing outer blanks comprising an outer center pillar blank, an outer upper front pillar blank and an outer side rail blank, the outer blanks being planar;

assembling the outer center pillar blank and the outer upper front pillar blank to the outer side rail blank in order to form a planar door frame outer reinforcement blank; and hot stamping the door frame outer reinforcement blank to shape the three-dimensional vehicle door frame outer reinforcement element;

the door frame outer reinforcement element further comprising an outer lower front pillar part joined to the outer upper front pillar part, and an outer lowerside sill part joining the outer lower front pillar part to the outer center pillar part, wherein producing the three-dimensional vehicle door frame outer reinforcement element further comprises:

providing an outer lower front pillar blank and an outer lowerside sill blank, the outer lower front pillar and outer lowerside sill blanks being planar; and assembling the outer lower front pillar blank to the outer upper front pillar blank, and assembling the outer lowerside sill blank to the outer lower front pillar blank and to the outer center pillar blank in order to form the planar door frame outer reinforcement blank;

and wherein the inner lowerside sill part is assembled to the outer lowerside sill part to form the lowerside sill.

15. The method as recited in claim 14, wherein the inner lowerside sill part is made of a steel having a fully martensitic microstructure, and having a tensile strength higher than or equal to 1700 Mpa.

16. The method as recited in claim 11, wherein the front and rear transversal beams are applied on an inner lowerside sill part, the inner lowerside sill part having a shape complementary to that of an outer lowerside sill part such that, when the inner lowerside sill part and the outer lowerside sill part are assembled, they form a lowerside sill, and such that the lowerside sill has a hollow closed section between the inner and outer lowerside sill parts.

17. The method as recited in claim 16, wherein the inner and outer lowerside sill parts have respectively an upper flange and a lower flange, and, when the inner lowerside sill part and the outer lowerside sill part are assembled, the upper flange of the inner lowerside sill part is applied on the upper flange of the outer lowerside sill part, and the lower flange of the inner lowerside sill part is applied on the lower flange of the outer lowerside sill part to delimit the hollow closed section.

18. A method for producing a vehicle door frame including at least a front pillar, a center pillar and a side rail, formed by the assembly of a three-dimensional vehicle door frame outer reinforcement element and of a three-dimensional vehicle door frame inner reinforcement element, the method comprising:

producing a three-dimensional vehicle door frame outer reinforcement element;

producing a three-dimensional vehicle door frame inner reinforcement element, the door frame inner reinforcement element including at least an inner center pillar part, an inner front pillar part and an inner side rail part, the inner side rail part joining the inner center pillar part and the inner front pillar part, and assembling the door frame outer reinforcement element and the door frame inner reinforcement element to form the vehicle door frame, the producing of the three-dimensional vehicle door frame inner reinforcement element comprising:

providing inner blanks, one of said inner blanks being an inner center pillar blank, another one of said inner blanks being an inner front pillar blank and a third one of said inner blanks being an inner side rail blank, the inner blanks being planar;

assembling the inner center pillar blank and the inner front pillar blank to the inner side rail blank in order to form a planar door frame inner reinforcement blank; and hot stamping the planar door frame inner reinforcement blank to shape the three-dimensional door frame inner reinforcement element, wherein the outer reinforcement element is ring-shaped and the inner reinforcement element has an open shape at a lower end of the inner side rail part and at a lower end of the front pillar.

* * * * *